US00RE39648E

(19) United States
(12) Reissued Patent
Outten et al.

(10) Patent Number: US RE39,648 E
(45) Date of Reissued Patent: May 22, 2007

(54) CRANKCASE LUBRICANT FOR HEAVY DUTY DIESEL OIL

(75) Inventors: Edward Francis Outten, East Brunswick, NJ (US); Andrew James Dalziel Ritchie, Chatham, NJ (US)

(73) Assignee: Infineum USA L.P., Linden, NJ (US)

(21) Appl. No.: 09/911,879

(22) Filed: Jul. 24, 2001

Related U.S. Patent Documents

Reissue of:
(64) Patent No.: 5,719,107
Issued: Feb. 17, 1998
Appl. No.: 08/695,353
Filed: Aug. 9, 1996

(51) Int. Cl.
*C10M 141/02* (2006.01)
*C10M 141/12* (2006.01)

(52) U.S. Cl. ..... 508/185; 508/186; 508/192; 508/322; 508/368; 508/390; 508/391; 508/572; 508/586

(58) Field of Classification Search ..... 508/185, 508/186, 322, 368, 586
See application file for complete search history.

(56) References Cited

U.S. PATENT DOCUMENTS

| | | | | | |
|---|---|---|---|---|---|
| 4,282,107 | A | * | 8/1981 | Zoleski et al. | 508/295 |
| 4,904,401 | A | * | 2/1990 | Ripple et al. | 508/237 |
| 4,938,880 | A | * | 7/1990 | Waddoups et al. | 508/192 |
| 4,938,883 | A | * | 7/1990 | Slama | 508/460 |
| 4,941,984 | A | * | 7/1990 | Chamberlin et al. | 508/237 |
| 4,957,649 | A | * | 9/1990 | Ripple et al. | 508/237 |
| 4,981,602 | A | * | 1/1991 | Ripple et al. | 508/237 |
| 5,102,566 | A | * | 4/1992 | Fetterman et al. | 508/294 |
| 5,141,657 | A | * | 8/1992 | Fetterman et al. | 508/192 |
| 5,202,036 | A | * | 4/1993 | Ripple et al. | 508/192 |
| 5,312,554 | A | * | 5/1994 | Waddoups et al. | 508/189 |
| 5,320,765 | A | * | 6/1994 | Fetterman et al. | 508/192 |
| 5,451,333 | A | * | 9/1995 | Waddoups et al. | 508/278 |
| 5,486,300 | A | * | 1/1996 | Salomon et al. | 508/380 |
| 5,498,355 | A | * | 3/1996 | Perozzi et al. | 508/194 |
| 5,558,802 | A | * | 9/1996 | Dowling | 508/391 |

FOREIGN PATENT DOCUMENTS

| | | | |
|---|---|---|---|
| EP | 0 277 729 A1 | * | 8/1988 |
| EP | 0 317 354 | * | 5/1989 |
| WO | WO 92/18588 | * | 10/1992 |

OTHER PUBLICATIONS

PCT Search Report, date Sep. 5, 1995.*
Mack Truck Technical Services Standard Test Procedure No. 5GT 57 "Mack T–7:Diesel Engine Oil Viscosity Evaluation", Aug. 31, 1984 (Mack T–7).*
Mack Truck Technical Services Standard Test Procedure No. 5GT "Mack T–8: Diesel Engine Oil Viscosity Evaluation", Oct. 1993 (Mack T–8).*
"Corrosion in Lubricant Systems", Dr. Tony Smith, M.Sc., Anti–Corrosion. Nov. 1983, pp. 15–16.*
"Corrosion of Copper and Lead Containing Materials by Diesel Lubricants", C.M. Cusano and J.C. Wang, Cummins Engine Company, Journal of the Society of Tribologists and Lubrication Engineers, Lubrication Engineering, vol. 51, 1, pp. 89–95, date unavailable.*
"The Function of Lube–Oil in Fighting Corrosion in Medium–Speed Engines", P.R. Belcher, Bsc, CEng, Shell International Petroleum Co. Ltd., Lubrication Engineering, Feb. 1993, pp. 145–150.*
"Protective Automotive Lubricants", Andras Zakar, Hungarian Hydrocarbon Institute, Journal of the Society of Tribologists and Lubrication Engineers, vol. 49, 2, pp. 145–150, date unavailable.*

* cited by examiner

*Primary Examiner*—Ellen M. McAvoy

(57) ABSTRACT

Thus, the instant invention is directed toward an oil for diesel engines comprising an admixture of (A) a major amount of an oil of lubricating viscosity, (B) at least 4 mass % dispersant, (C) at least 0.3 mass % of a metal phenate, (D) less than 0.1 mass % friction modifier, (E) less than 0.3 mass % of *ashless* sulfurized phenols and, (F) less than 0.12 mass % neutral calcium sulfonate.

14 Claims, No Drawings

CRANKCASE LUBRICANT FOR HEAVY DUTY DIESEL OIL

Matter enclosed in heavy brackets [ ] appears in the original patent but forms no part of this reissue specification; matter printed in italics indicates the additions made by reissue.

FIELD OF THE INVENTION

The present invention relates to a crankcase lubricant which exhibits superior corrosion inhibition properties in heavy duty diesel engines and super high performance diesel engines.

BACKGROUND OF THE INVENTION

Over the years, the heavy duty trucking market has adopted the diesel engine as its preferred power source due to both its excellent longevity and its economy of operation. Specialized lubricants have been developed to meet the more stringent performance requirements of HD diesel engines compared to passenger car engines.

Starting in the late 1980's, changes in the U.S. emission laws began to force significant changes in heavy duty diesel engine design. Although not all of these changes had an impact on lubricants, taken as a whole, they generally required higher quality lubricants to maintain acceptable performance in the redesigned engines.

The American Petroleum Institute (API) has responded to these increasing performance requirements by raising the heavy duty oil quality levels from CD to CE, CF-4 and, most recently, CG-4.

As we look to the future, HD diesel emissions limits will tighten once again in 1998 with a 20% reduction in $NO_x$. ASTM is already hard at work on a new performance category identified as PC-7 (proposed category-7), aimed at meeting the performance needs of 1998 engines.

The PC-7 category is being designed to give significant improvements in diesel detergency, soot and wear control for HD lubricants. Several new diesel engine tests are being developed for this category such as the:

Caterpillar 1P single cylinder test engine to evaluate piston deposits

Mack T-9 six cylinder test to examine ring and liner wear

Cummins M11 test to evaluate soot-related valve train wear, filter plugging and sludge.

The PC-7 category will also include some of the engine tests from previous categories but with more stringent test limits.

SUMMARY OF THE INVENTION

Thus, there is a need in the art for lubricating oils that are capable of meeting the future HD diesel requirements. Typically, for example, to control corrosion, one skilled in the art would utilize a thiadiazole. Applicants have found that such conventional additives do not impart the necessary characteristics to yield an oil meeting the performance attributes that are likely to be required in the PC-7 category when utilized in the oils herein described.

The instant invention is designed to provide satisfactory performance in the new PC-7 proposed engine and bench tests as well as those used in the current CG-4 and prior CF-4 categories.

Surprisingly, applicants have discovered a lubricating oil which affords excellent corrosion resistance as well as improved wear performance, even at high dispersant treat rates, without sacrificing performance in the new PC-7 category proposed Cat 1 P, Mack T-9 and Cummins M11 tests and current CG-4 and CF-4 category tests. Thus, the instant invention is directed toward an oil for diesel engines comprising a major amount of an oil of lubricating viscosity to which has been added (A) at least 4 mass % dispersant, (B) at least 0.3 mass % of an oil soluble metal phenate, (C) less than 0.1 mass % friction modifier, (D) less than 0.3 mass % of *ashless* sulfurized phenols, (E) less than 0.12 mass % of an oil soluble low base number calcium sulfonate.

As used herein, all mass % numbers are on an active ingredient basis unless otherwise noted.

In a preferred embodiment, the oils will have a sulfated ash content of from about 0.35 to about 2 mass %. Sulfated ash is the total weight percent of ash (based on the oil's metal content) and is determined for a given oil by ASTM D874.

In other aspects of the invention, the lubricant described above is free of aromatic amines having at least two aromatic groups attached directly to the nitrogen and hetero cyclic nitrogen. Preferably the lubricant both is free of aromatic amines having at least two aromatic groups attached directly to the nitrogen and includes at least 0.0008 mole % hindered phenol antioxidant. Hindered phenol antioxidants are oil soluble phenolic compounds where the hydroxy group is sterically hindered. In further aspects of the invention the lubricant has additives providing at least 100 ppm (mass) boron. The boron-to-nitrogen mass ratio is at least 0.1. A common industry standard method for determining boron levels in lubricating oils is ASTM D5185.

In yet another aspect of the invention, the lubricating oil will contain an oil soluble overbased metal sulfonate, conveniently, magnesium, calcium, or sodium, and mixtures thereof will be used. The sulfonate will be present in an amount of from about 0.2 to 2 mass %. Most conveniently, magnesium sulfonate will be used.

DETAILED DESCRIPTION

LUBRICATING OIL

The oil of lubricating viscosity may be selected from any of the synthetic or natural oils used as crankcase lubricating oils for spark-ignited and compression-ignited engines. The oil of lubricating viscosity conveniently has a viscosity of about 2.5 to about 12 $mm^2/s$ and preferably about 2.5 to about 9 $mm^2/s$ at 100° C. Mixtures of synthetic and natural base oils may be used if desired.

DISPERSANT

The dispersant comprises an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. The dispersant may be, for example, selected from oil soluble salts, esters, amino-esters, amides, imides, and oxazolines of long chain hydrocarbon substituted mono and dicarboxylic acids or their anhydrides; thiocarboxylate derivatives of long chain hydrocarbons; long chain aliphatic hydrocarbons having a polyamine attached directly thereto; and Mannich condensation products formed by condensing a long chain substituted phenol with formaldehyde and polyalkylene polyamine, and Koch reaction products.

The oil soluble polymeric hydrocarbon backbone is typically an olefin polymer, especially polymers comprising a major molar amount (i.e. greater than 50 mole %) of a $C_2$ to $C_{18}$ olefin (e.g., ethylene, propylene, butylene, isobutylene, pentene, octene-1, styrene), and typically a $C_2$ to $C_5$ olefin. The oil soluble polymeric hydrocarbon backbone may be a homopolymer (e.g., polypropylene or polyisobutylene) or a copolymer of two or more of such olefins (e.g., copolymers of ethylene and an alpha-olefin such as propylene and butylene or copolymers of two different alpha-olefins). Other copolymers include those in which a minor molar amount of the copolymer monomers, e.g., 1 to 10 mole %, is an alpha, ω-diene, such as a $C_3$ to $C_{22}$ non-conjugated diolefin (e.g., a copolymer of isobutylene and butadiene, or a copolymer of ethylene, propylene and 1,4-hexadiene or 5-ethylidene-2-norbornene). Atactic propylene oligomer typically having $\overline{M}_n$ of from 700 to 5000 may also be used as described in EP-A-490454, as well as heteropolymers such as polyepoxides.

One preferred class of olefin polymers is polybutenes and specifically polyisobutenes (PIB) or poly-n-butenes, such as may be prepared by polymerization of a $C_4$ refinery stream. Another preferred class of olefin polymers is ethylene alpha-olefin (EAO) copolymers or alpha-olefin homo- and copolymers such as may be prepared using the new metallocene chemistry having in each case a high degree (e.g. >30%) of terminal vinylidene unsaturation. The term alpha-olefin is used herein to refer to an olefin of the formula:

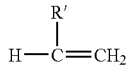

wherein R' is probably a $C_1$–$C_{16}$ alkyl group.

The requirement for terminal vinylidene unsaturation refers to the presence in the polymer of the following structure:

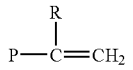

wherein P is the polymer chain and R is a $C_1$–$C_{16}$ alkyl group, typically methyl or ethyl. Preferably the polymers have at least 50% of the polymer chains with terminal vinylidene unsaturation. EAO copolymers of this type preferably contain 1 to 50 wt. % ethylene, and more preferably 5 to 45 wt. % ethylene. Such polymers may contain more than one alpha-olefin and may contain one or more $C_3$ to $C_{22}$ diolefins. Also usable are mixtures of EAO's of low ethylene content with EAO's of high ethylene content. The EAO's may also be mixed or blended with PIB's of various $\overline{M}$n's or components derived from these may be mixed or blended. Atactic propylene oligomer typically having Mn of from 700 to 5000 may also be used, as described in EP-A-490454.

Suitable olefin polymers and copolymers may be prepared by cationic polymerization of hydrocarbon feedstreams, usually $C_3$–$C_5$, in the presence of a reaction promoter (water, alcohol and HCl), and strong Lewis acid catalyst usually an organoaluminum such as $HlCl_3$ or ethylaluminum dichloride. Tubular or stirred reactors may be used. Such polymerization and catalysts are described, e.g., in U.S. Pat. Nos. 4,935,576 and 4,952,739. Fixed bed catalyst systems may also be used as in U.S. Pat. No. 4,982,045 and UK-A-2, 001,662. Most commonly, polyisobutylene polymers are derived from Raffinate 1 refinery feedstreams. Conventional Ziegler-Natta polymerization may also be employed to provide olefin polymers suitable for use to prepare dispersants and other additives.

Suitable olefin polymers and copolymers for use herein may be prepared by various catalytic polymerization processes using metallocene catalysts which are, for example, bulky transition metal compounds of the formula:

$$[L]_m M[A]_n$$

where L is a bulky ligand; A is a leaving group, M is a transition metal, and m and n are such that the total ligand valency corresponds to the transition metal valency. Preferably the catalyst is four co-ordinate such that the compound is ionizable to a $1^+$ valency state.

The ligands L and A may contain bridges between any two ligands. The metallocene compound may be a full sandwich compound having two or more ligands L which may be cyclopentadienyl ligands or cyclopentadienyl derived ligands, or they may be half sandwich compounds having one such ligand L. The ligand may be mono- or polynuclear or any other ligand capable of η-5 bonding to the transition metal.

One or more of the ligands may π-bond to the transition metal atom, which may be a Group 4, 5 or 6 transition metal and/or a lanthanide or actinide transition metal, with zirconium, titanium and hafnium being particularly preferred.

The ligands may be substituted or unsubstituted, and mono-, di-, tri, tetra- and penta-substitution of the cyclopentadienyl ring is possible. Optionally the substituent(s) may act as one or more bridges between the ligands and/or leaving groups and/or transition metal. Such bridges typically comprise one or more of a carbon, germanium, silicon, phosphorus or nitrogen atom-containing radical, and preferably the bridge places a one atom link between the entities being bridged, although that atom may and often does carry other substituents.

These catalysts are typically used with activators.

The metallocene may also contain a further displaceable ligand, preferably displaced by a cocatalyst—a leaving group—that is usually selected from a wide variety of hydrocarbyl groups and halogens.

Such polymerizations, catalysts, and cocatalysts or activators are described, for example, in U.S. Pat. Nos. 4,530,914; 4,665,208; 4,808,561; 4,871,705; 4,897,455; 4,937,299; 4,952,716; 5,017,714; 5,055,438; 5,057,475; 5,064,802; 5,096,867; 5,120,867; 5,124,418; 5,153,157; 5,198,401; 5,227,440; 5,241,025; U.S. Ser. No. 992,690 (filed Dec. 17, 1992); EP-A-129,368; 277,003; 277,004; 420,436; 520,732; WO91/04257; 92/00333; 93/08199 and 93/08221; and 94/07928.

The oil soluble polymeric hydrocarbon backbone will usually have number average molecular weight ($\overline{M}$n) within the range of from 300 to 20,000. The $\overline{M}$n of the backbone is preferably within the range of 500 to 10,000, more preferably 700 to 5,000 where the use of the backbone is to prepare a component having the primary function of dispersancy. Hetero polymers such as polyepoxides are also usable to prepare components. Both relatively low molecular weigh ($\overline{M}$n 500 to 1500) and relatively high molecular weight ($\overline{M}$n 1500 to 5,000 or greater) polymers are useful to make dispersants. Particularly useful olefin polymers for use in dispersants have $\overline{M}$n within the range of from 900 to 3000. Where the component is also intended to have a viscosity modification effect it is desirable to use higher molecular weight, typically with $\overline{M}$n of from 2,000 to 20,000, and if the component is intended to function primarily as a viscosity modifier then the molecular weight may be even higher with an $\overline{M}$n of from 20,000 up to 500,000 or greater. The functionalized olefin polymers used to prepare dispersants preferably have approximately one terminal double bond per polymer chain.

The $\overline{M}n$ for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

The oil soluble polymeric hydrocarbon backbone may be functionalized to incorporate a functional group into the backbone of the polymer, or as one or more groups pendant from the polymer backbone. The functional group typically will be polar and contain one or more hetero atoms such as P, O, S, N, halogen, or boron. It can be attached to a saturated hydrocarbon part of the oil soluble polymeric hydrocarbon backbone via substitution reactions or to an olefinic portion via addition or cycloaddition reactions. Alternatively, the functional group can be incorporated into the polymer in conjunction with oxidation or cleavage of the polymer chain end (e.g., as in ozonolysis).

Useful functionalization reactions include: halogenation of the polymer allylic to the olefinic bond and subsequent reaction of the halogenated polymer with an ethylenically unsaturated functional compound (e.g., maleation where the polymer is reacted with maleic acid or anhydride); reaction of the polymer with an unsaturated functional compound by the "ene" reaction absent halogenation; reaction of the polymer with at least one phenol group (this permits derivatization in a Mannich base-type condensation); reaction of the polymer at a point of unsaturation with carbon monoxide using a hydroformylation catalyst or a Koch-type reaction to introduce a carbonyl group attached to a —$CH_2$— or in an iso or neo position; reaction of the polymer with the functionalizing compound by free radical addition using a free radical catalyst; reaction with a thiocarboxylic acid derivative; and reaction of the polymer by air oxidation methods, epoxidation, chloroamination, or ozonolysis.

The functionalized oil soluble polymeric hydrocarbon backbone is then further derivatized with a nucleophilic reactant such as an amine, amino-alcohol, alcohol, metal compound or mixture thereof to form a corresponding derivative. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxy groups, alkoxy groups, amide groups, nitriles, imidazoline groups, and the like. Particularly useful amine compounds include mono- and polyamines, e.g. polyalkylene and polyoxyalkylene polyamines of about 2 to 60, conveniently 2 to 40 (e.g., 3 to 20) total carbon atoms and about 1 to 12, conveniently 3 to 12, and preferably 3 to 9 nitrogen atoms in the molecule. Mixtures of amine compounds may advantageously be used such as those prepared by reaction of alkylene dihalide with ammonia. Preferred amines are aliphatic saturated amines, including, e.g., 1,2-diaminoethane; 1,3-diaminopropane; 1,4-diaminobutane; 1,6-diaminohexane; polyethylene amines such as diethylene triamine; triethylene tetramine; tetraethylene pentamine; and polypropyleneamines such as 1,2-propylene diamine; and di-(1,3-propylene) triamine.

Other useful amine compounds include: alicyclic diamines such as 1,4-di(aminomethyl) cyclohexane, and heterocyclic nitrogen compounds such as imidazolines. A particularly useful class of amines are the polyamido and related amido-amines as disclosed in U.S. Pat. Nos. 4,857,217; 4,956,107; 4,963,275; and 5,229,022. Also usable is tris(hydroxymethyl)amino methane (THAM) as described in U.S. Pat. Nos. 4,102,798; 4,113,639; 4,116,876; and UK 989,409. Dendrimers, star-like amines, and comb-structure amines may also be used. Similarly, one may use the condensed amines disclosed in U.S. Pat. No. 5,053,152. The functionalized polymer is reacted with the amine compound according to conventional techniques as described in EP-A 208,560; U.S. Pat. Nos. 4,234,435 and 5,229,022.

The functionalized oil soluble polymeric hydrocarbon backbones also may be derivatized with hydroxy compounds such as monohydric and polyhydric alcohols or with aromatic compounds such as phenols and naphthols. Polyhydric alcohols are preferred, e.g., alkylene glycols in which the alkylene radical contains from 2 to 8 carbon atoms. Other useful polyhydric alcohols include glycerol, monooleate of glycerol, monostearate of glycerol, monomethyl ether of glycerol, pentaerythritol, dipentaerythritol, and mixtures thereof. An ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding dispersants comprise the ether-alcohols including, for example, oxy-alkylene, oxy-arylene. They are exemplified by ether-alcohols having up to 150 oxy-alkylene radicals in which the alkylene radical contains from 1 to 8 carbon atoms. The ester dispersants may be di-esters of succinic acids or acidic esters, i.e., partially esterified succinic acids; as well as partially esterified polyhydric alcohols or phenols, i.e., esters having free alcohols or phenolic hydroxyl radicals. An ester dispersant may be prepared by one of several known methods as illustrated, for example, in U.S. Pat. No. 3,381,022.

A preferred group of dispersants includes those substituted with succinic anhydride groups and reacted with polyethylene amines (e.g., tetraethylene pentamine), aminoalcohols such as trismethylolaminomethane, polymer products of metallocene catalyzed polymerisations, and optionally additional reactants such as alcohols and reactive metals e.g., pentaerythritol, and combinations thereof). Also useful are dispersants wherein a polyamine is attached directly to the backbone by the methods shown in U.S. Pat. Nos. 5,225,092, 3,275,554 and 3,565,804 where a halogen group on a halogenated hydrocarbon is displaced with various alkylene polyamines.

Another class of dispersants comprises Mannich base condensation products. Generally, these are prepared by condensing about one mole of an alkyl-substituted mono- or polyhydroxy benzene with about 1 to 2.5 moles of carbonyl compounds (e.g., formaldehyde and paraformaldehyde) and about 0.5 to 2 moles polyalkylene polyamine as disclosed, for example, in U.S. Pat. No. 3,442,808. Such Mannich condensation products may include a polymer product of a metallocene catalyzed polymerisation as a substituent on the benzene group or may be reacted with a compound containing such a polymer substituted on a succinic anhydride, in a manner similar to that shown in U.S. Pat. No. 3,442,808.

Another class of dispersant includes Koch type dispersants as disclosed in Canadian Patent CA 2110871 herein incorporated by reference.

Examples of functionalized and/or derivatized olefin polymers based on polymers synthesized using metallocene catalyst systems are described in publications identified above.

The dispersant can be further post-treated by a variety of conventional post treatments such as boration, as generally taught in U.S. Pat. Nos. 3,087,936 and 3,254,025. This is readily accomplished by treating an acyl nitrogen-containing dispersant with a boron compound selected from the group consisting of boron oxide, boron halides, boron acids and esters of boron acids or highly borated low $\overline{M}_w$ dispersant, in an amount to provide a boron to nitrogen mole ratio of 0.01–3.0. Usefully the dispersants contain from about 0.05 to 2.0 wt. %, e.g. 0.05 to 0.7 wt. % boron based on the total weight of the borated acyl nitrogen compound. The boron, which appears be in the product as dehydrated boric acid polymers (primarily $(HBO_2)_3$), is believed to attach to the dispersant nitrogen atoms and as amine salts e.g., a metaborate salt. Boration is readily carried out by adding from about 0.05 to 4, e.g., 1 to 3 wt. % (based on the weight of acyl nitrogen compound) of a boron compound, preferably boric acid, usually as a slurry, to the acyl nitrogen compound and heating with stirring at from 135° to 190° C., e.g., 140°–170° C., for from 1 to 5 hours followed by nitrogen stripping. Alternatively, the boron treatment can be carried out by adding boric acid to a hot reaction mixture of the dicarboxylic acid material and amine while removing water. Additionally other finishing steps such as those disclosed in U.S. Pat. No. 5,464,549, herein incorporated by reference, may be used.

DISPERSANT VISCOSITY MODIFIERS

The viscosity modifier functions to impart high and low temperature operability to a lubricating oil. The VM used may have that sole function, or may be multifunctional.

Multifunctional viscosity modifiers that also function as dispersants are also known and may be prepared as described above for dispersants. The oil soluble polymeric hydrocarbon backbone will usually have a $\overline{M}n$ of from 20,000, more typically from 20,000 up to 500,000 or greater. In general, these dispersant viscosity modifiers are functionalized polymers (e.g. inter polymers of ethylene-propylene post grafted with an active monomer such as maleic anhydride) which are then derivatized with, for example, an alcohol or amine.

Suitable compounds for use as monofunctional viscosity modifiers are generally high molecular weight hydrocarbon polymers, including polyesters. Oil soluble viscosity modifying polymers generally have weight average molecular weights of from about 10,000 to 1,000,000, preferably 20,000 to 500,000, which may be determined by gel permeation chromatography (as described above) or by light scattering.

Representative examples of suitable viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

In general, viscosity modifiers that function as dispersant viscosity modifiers are polymers as described above that are functionalized (e.g. inter polymers of ethylene-propylene post grafted with an active monomer such as maleic anhydride) and then derivatized with an alcohol or amine. Description of how to make such dispersant viscosity modifiers are found in U.S. Pat. Nos. 4,089,794, 4,160,739, and 4,137,185. Other dispersant viscosity modifiers are copolymers of ethylene or propylene reacted or grafted with nitrogen compounds such as shown in U.S. Pat. Nos. 4,068,056, 4,068,058, 4,146,489 and 4,149,984.

The viscosity modifier used in the invention will be used in an amount to give the required viscosity characteristics. Since they are typically used in the form of oil solutions the amount of additive employed will depend on the concentration of polymer in the oil solution comprising the additive. However by way of illustration, typical oil solutions of polymer used as VMs are used in amount of from 1 to 30% of the blended oil. The amount of VM as active ingredient of the oil is generally from 0 to 2 wt %, and more preferably from 0 to 1.2 wt %.

Dispersant polymethacrylate viscosity modifiers such as Rohm & Haas' "ACRYLOID 985" are particularly useful in reducing soot associated viscosity increases and in limiting buildup of filter pressure drop in diesel engines such as the Cummins M11 and Mack T8 engine tests proposed for the PC-7 HD category. Such low molecular weight multifunctional polymethacrylate VMs can be used in combination with other VMs and may be incorporated into an adpack.

METAL PHENATES

The lubricant oil of the present invention includes at least 0.3 mass % of a metal phenate which may be neutral or overbased. Conveniently, the phenates will be used in amounts from 0.3 to 1.5 mass %, and most conveniently from 0.35 to 1 mass %. For example, alkylated metal phenates and sulfurized alkylated metal phenates are included in the instant invention. Suitable metal phenates include calcium, magnesium and mixtures or hydrids (mixed metal salts) of the two. Such salts are readily obtainable in the art. Most conveniently a calcium phenate will be used. Methods for preparing metal phenates are disclosed in references such as U.S. Pat. No. 3,966,621 and EP 95322-B herein incorporated by reference.

Metal salts of phenols and sulfurised phenols are prepared by reaction with an appropriate metal compound such as an oxide or hydroxide and neutral or overbased products may be obtained by methods well known in the art. Sulfurised phenols may be prepared by reacting a phenol with sulfur or a sufur containing compound such as hydrogen sulfide, sulfur monohalide or sulfur dihalide, to form products which are generally mixtures of compounds in which 2 or more phenols are bridged by sulfur containing bridges.

FRICTION MODIFIERS

Friction modifiers may be included to improve fuel economy.

Friction modifiers may be grouped into two classes. The first class includes polar/H bonding molecules with hydrocarbon tails which have a low coefficient of friction (pack well). Non limiting examples of polar/H bonding heads are —OH, —NH, —COOH, —OPOOH. $—N(CH_2CH_2OH)_2$, $—COO—CH_2CH(OH)—OOC—$, Non-limiting examples of hydrocarbon tails include linear $C_{16}H_{33}$, oleil, linoleil, $C_{18}H_{35}$ (double bond), and isostearil. The common ingredient is a linear chain $C_{14}$ to $C_{12}$ and a small imperfection which disrupts the carbon chain like 1 to 2 double bonds, 1 or 2 $CH_3$, one ethyl group, —O—CCC or —SCC.

The second class of friction modifiers are solids like TEFLON, graphite and molybdenum sulfide.

Oil-soluble alkoxylated mono- and diamines are well known to improve boundary layer lubrication. The amines may be used as such or in the form of an adduct or reaction product with a boron compound such as a boric oxide, boron halide, metaborate, boric acid or a mono-, di- or trialkyl borate.

Other friction modifiers are known. Among these are esters formed by reacting carboxylic acids and anhydrides with alkanols. Other conventional friction modifiers generally consist of a polar terminal group (e.g. carboxyl or hydroxyl) covalently bonded to an oleophillic hydrocarbon chain. Esters of carboxylic acids and anhydrides with alkanols are described in U.S. Pat. No. 4,702,850. Examples of other conventional friction modifiers are described by M. Belzer in the "Journal of Tribology" (1992), Vol. 114, pp. 675–682 and M. Belzer and S. Jahanmir in "Lubrication Science" (1988), Vol. 1, pp. 3–26.

When used in the instant invention, the friction modifier will be used at less than 0.1 mass %, preferably it will be avoided (substantially absent) altogether except for such amounts as may result from an impurity in another component.

SULFURIZED PHENOLS

The oil of the instant invention contains less than 0.3 mass % *ashless* sulfurized phenols. Conveniently, less than 0.1 mass % of such components will be used, and most conveniently these components will be avoided altogether (substantially absent) except for such amounts as may result from an impurity in another component. [Sulfurized] *Ashless sulfurized* phenols utilized in oils of the instant type are known in the art and include all of the alkyl phenyl sulfides such as nonyl phenyl sulfide. [and such oxidation inhibitors as alkaline earth metal salts of alkylphenolthioesters having preferably $C_5$ to $C_{12}$ alkyl side chains, and calcium nonylphenol sulfide.]

Conveniently, the oils will also contain less than 0.3 mass % sulfurized ester. Preferably the oils will contain less than 0.1 mass % sulfurized ester and most conveniently sulfurized esters will be substantially absent (as defined above).

The sulfurized esters are known in the art and may be prepared, for example from aliphatic olefinic acids and alcohols and polyols such as methanol, ethanol, n- or isopropanol, n-, iso-, sec-, or glycol, propylene glycol, trimethylene glycol, neopentyl glycol, glycerol, etc. For example, those sulfurized alcohols appearing in U.S. Pat. No. 5,486,300 herein incorporated by reference.

LOW BASE NUMBER CALCIUM SULFONATE

The oils of the instant invention also include less than 0.12 mass % of neutral calcium sulfonate. In a preferred embodiment, the oils will be substantially free of neutral calcium sulfonates. In the most preferred embodiment, neutral calcium sulfonates will be avoided altogether other than such amounts as may result as an impurity from another component of the composition. Low base number calcium sulfonates are known in the art and are easily prepared or purchased. As used herein, low base number salts include salts having a TBN of less than or equal to 80 and a metal ratio of less than 3.5.

OTHER DETERGENT INHIBITOR PACKAGE ADDITIVES

Additional additives are typically incorporated into the compositions of the present invention. Examples of such additives are metal or ash-containing detergents, antioxidants, anti-wear agents, rust inhibitors, anti-foaming agents, demulsifiers, and pour point depressants.

Metal-containing or ash-forming detergents function both as detergents to reduce or remove deposits and as acid neutralizers or rust inhibitors, thereby reducing wear and corrosion and extending engine life. Detergents generally comprise a polar head with a long hydrophobic tail, with the polar head comprising a metal salt of an acidic organic compound. The salts may contain a substantially stoichiometric amount of the metal in which case they are usually described as normal or neutral salts, and would typically have a total base number or TBN (as may be measured by ASTM D2896) of from 0 to 80. It is possible to include large amounts of a metal base by reacting an excess of a metal compound such as an oxide or hydroxide with an acidic gas such as carbon dioxide. The resulting overbased detergent comprises neutralised detergent as the outer layer of a metal base (e.g. carbonate) micelle. Such overbased detergents may have a TBN of 150 or greater, and typically of from 250 to 450 or more.

Detergents that may be used include oil-soluble neutral and overbased sulfonates, phenates, sulfurized phenates, thiophosphonates, salicylates, and naphthenates and other oil-soluble carboxylates of a metal, particularly the alkali or alkaline earth metals, e.g., sodium, potassium, lithium, calcium, and magnesium (With the constraints noted herein). The most commonly used metals are calcium and magnesium, which may both be present in detergents used in a lubricant, and mixtures of calcium and/or magnesium with sodium. Particularly convenient metal detergents are overbased calcium sulfonates having TBN of from about 250 and up, conveniently, a TBN from about 250 to about 450 and neutral and overbased calcium phenates and sulfurized phenates having TBN of from 50 and up, conveniently from 50 to 450.

Sulfonates may be prepared from sulfonic acids which are typically obtained by the sulfonation of alkyl substituted aromatic hydrocarbons such as those obtained from the fractionation of petroleum or by the alkylation of aromatic hydrocarbons. Examples included those obtained by alkylating benzene, toluene, xylene, naphthalene, diphenyl or their halogen derivatives such as chlorobenzene, chlorotoluene and chloronaphthalene. The alkylation may be carried out in the presence of a catalyst with alkylating agents having from about 3 to more than 70 carbon atoms. The alkaryl sulfonates usually contain from about 9 to about 80 or more carbon atoms, preferably from about 16 to about 60 carbon atoms per alkyl substituted aromatic moiety.

The oil soluble sulfonates or alkyl aryl sulfonic acids may be neutralized with oxides, hydroxides, alkoxides, carbonates, carboxylate, sulfides, hydrosulfides, nitrates, borates and ethers of the metal. The amount of metal compound is chosen having regard to the desired TBN of the final product but typically ranges from about 100 to 220 wt % (preferably at least 125 wt %) of that stoichiometrically required. In a preferred embodiment, the instant oil will include an overbased sulfonate, most conveniently, magnesium sulfonate.

Dihydrocarbyl dithiophosphate metal salts are frequently used as anti-wear and antioxidant agents. The metal may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dihydrocarbyl dithiophosphoric acid (DDPA), usually by reaction of one or more alcohol or a phenol with $P_2S_5$ and then neutralizing the formed DDPA with a zinc compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the zinc salt any basic or neutral zinc compound could be used but the oxides, hydroxides and carbonates are most generally employed. Commercial additives frequently contain an excess of zinc due to use of an excess of the basic zinc compound in the neutralization reaction.

The preferred zinc dihydrocarbyl dithiophosphates are oil soluble salts of dihydrocarbyl dithiophosphoric acids and may be represented by the following formula:

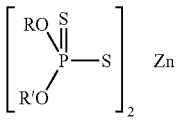

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be about 5 or greater. The zinc dihydrocarbyl dithiophosphate can therefore comprise zinc dialkyl dithiophosphates. Conveniently at least 50 (mole) % of the alcohols used to introduce hydrocarbyl groups into the dithiophosphoric acids are secondary alcohols.

Greater percentages of secondary alcohols are preferred, and in particularly high nitrogen systems may be required. Thus the alcohols used to introduce the hydrocarbyl groups may be 60 or 75 mole % secondary. Most preferably the hydrocarbyl groups are more than 90 mole % secondary. Metal dithiophosphates that are secondary in character give better wear control in tests such as the Sequence VE (ASTM D5302) and the GM 6.2L tests. The high levels of nitrogenous TBN required by the present invention to control soot related viscosity may increase wear and corrosion performance.

Oxidation inhibitors or antioxidants reduce the tendency of mineral oils to deteriorate in service which deterioration can be evidence by the products of oxidation such as sludge and varnish-like deposits on the metal surfaces and by viscosity growth. Such oxidation inhibitors include hindered phenols, oil soluble phenates and sulfurized phenates, phosphosulfurized or sulfurized hydrocarbons, phosphorous esters, metal thiocarbamates, oil soluble copper compounds as described in U.S. Pat. No. 4,867,890, and molybdenum containing compounds. Such compounds are utilized within the constraints noted herein.

In one aspect of the invention the lubricant includes at least 0.0008 mole % hindered phenol antioxidant. Generally, hindered phenols are oil soluble phenols substituted at one or both ortho positions. Suitable compounds include monohydric and mononuclear phenols such as 2,6-di-tertiary alkylphenols (e.g. 2,6 di-t-butylphenol, 2,4,6 tri-t-butyl phenol, 2-t-butyl phenol, 4-alkyl, 2,6, t-butyl phenol, 2,6 di-isopropylphenol, and 2,6 dimethyl, 4 t-butyl phenol). Other suitable hindered phenols include polyhydric and polynuclear phenols such as alkylene bridged hindered phenols (4,4 methylenebis(6 tert butyl-o-cresol), 4,4'-methylenebis(2-tert-amyl-o-cresol), and 2,2'-methylenebis (2,6-di-t-butylphenol). The hindered phenol may be borated or sulfurized. Preferred hindered phenols have good oil solubility and relatively low volatility.

Rust inhibitors selected from the group consisting of nonionic polyoxyalkylene polyols and esters thereof, polyoxyalkylene phenols, and anionic alkyl sulfonic acids may be used.

Copper and lead bearing corrosion inhibitors may be used, but are typically not required with the formulation of the present invention. Typically such compounds are the thiadiazole polysulfides containing from 5 to 50 carbon atoms, their derivatives and polymers thereof. Derivatives of 1,3,4 thiadiazoles such as those described in U.S. Pat. Nos. 2,719,125; 2,719,126; and 3,087,932; are typical. Other similar materials are described in U.S. Pat. Nos. 3,821,236; 3,904,537; 4,097,387; 4,107,059; 4,136,043; 4,188,299; and 4,193,882. Other additives are the thio and polythio sulfenamides of thiadiazoles such as those described in UK. Patent Specification No. 1,560,830. Benzotriazoles derivatives also fall within this class of additives. When these compounds are included in the lubricating composition, they are preferably present in an amount not exceeding 0.2 wt % active ingredient.

A small amount of a demulsifying component may be used. A preferred demulsifying component is described in EP 330,522. It is obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers and polyalkylmethacrylates. Likewise, the dialkyl fumarate and vinyl acetate may be used as compatibilizing agents.

Incompatibility may occur when certain types of polymers for use in the manufacture of motor oil viscosity modifiers are dissolved in basestock. An uneven molecular dispersion of polymer which gives the mixture either a tendency to separate or a grainy appearance ensues. The problem is solved by using a compatibility agent having a hydrocarbon group attached to a functional group that serves to break up or prevent packing.

Foam control can be provided by many compounds including an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and does not require further elaboration. It is important to note that addition of the other components noted above must comply with the limitations set forth herein.

The invention will now be described by of illustration only with reference to the following examples. In the examples, unless otherwise noted, all treat rates of all additives are reported as mass percent active ingredient.

ADDITIVES THAT MAY ADVERSELY IMPACT SOME PERFORMANCE ASPECTS OF THE LUBRICANT

Several well known classes of additives are frequently used in universal crankcase lubricants. Aromatic amines having at least two aromatic groups attached directly to the nitrogen are often used for their antioxidant properties. While these materials may be used in small amounts, preferred embodiments of the present invention are free of these compounds. These aromatic amines have been found to impact soot induced viscosity increases. They are preferably used in only small amounts, or more preferably avoided altogether other than such amount as may result as an impurity from another component of the composition.

Typical oil soluble aromatic amines having at least two aromatic groups attached directly to one amine nitrogen contain from 6 to 16 carbon atoms. The amines may contain more than two aromatic groups. Compounds having a total of at least three aromatic groups in which two aromatic groups are linked by a covalent bond or by an atom or group (e.g., an oxygen or sulfur atom, or a —CO—, —$SO_2$— or alkylene group) and two are directly attached to one amine nitrogen also considered aromatic amines having at least two aromatic groups attached directly to the nitrogen. The aromatic rings are typically substituted by one or more substituents selected from alkyl, cycloalkyl, alkoxy, aryloxy, acyl, acylamino, hydroxy, and nitro groups. These compounds should be minimized or avoided altogether because they have been found to dramatically influence soot related viscosity increase in the Mack T-8. The amount of any such oil soluble aromatic amines having at least two aromatic groups attached directly to one amine nitrogen should preferably not exceed 0.2 wt % active ingredient.

Blends

When lubricating compositions contain one or more of the above-mentioned additives, each additive is typically blended into the base oil in an amount which enables the additive to provide its desired function. Representative effective amounts of such additives, when used in crankcase lubricants, are listed below.

All the values listed are stated as mass percent active ingredient.

| ADDITIVE | MASS % (Broad) | MASS % (Preferred) |
|---|---|---|
| Ashless Dispersant | 4–8 | 4–7 |
| Overbased Metal Sulfonates | 0.2–2 | 0.3–1.6 |
| Calcium Phenates | 0.3–1.5 | 0.35–1 |
| Corrosion Inhibitor | 0–0.2 | 0–0.1 |
| Metal dihydrocarbyl dithiophosphate | 0.5–1.3 | 0.8–1.2 |
| Supplemental anti-oxidant | 0–1.0 | 0.2–0.8 |
| Pour Point Depressant | 0.01–1 | 0.1–0.3 |
| Anti-Foaming Agent | 0.0005–0.005 | 0.001–0.004 |
| Supplemental Anti-wear Agents | 0–0.5 | 0–0.2 |
| Viscosity Modifier | 0–1.5 | 0–1.2 |
| Mineral or Synthetic Base Oil | Balance | Balance |

A useful formulation must balance many properties including dispersancy, detergency, antioxidancy, and wear protection. In many instances adding or increasing the level of an additive to improve one of these properties may also impair one or more of the other properties. In this sense the formulator's challenge is to define a zone of operability for each of the parameters while maintaining an acceptable cost.

Particularly good control of oil thickening is obtained when the formulation of the present invention both is free of alkyl substituted diphenyl amines and includes a hindered phenol. The metal dithiophosphate and hindered phenol control thermal oxidative oil thickening. Surprisingly a diphenyl amine aggravates soot induced thickening while a hindered phenol (including alkylene bridged bis phenols) does not aggravate soot induced thickening.

Yet another embodiment of the invention requires one or more boron containing additives whereby the lubricant contains at least 100 parts per million (ppm mass) of boron. Conveniently the lubricant contains 180 ppm (mass) boron. Boron helps control corrosion of bearings made from copper and lead. The high levels of nitrogen and magnesium required by the present invention can adversely impact corrosion of these copper/lead bearings. Conveniently, the mass ratio of boron-to-nitrogen is greater than 0.1. Persons skilled in the art of formulating are familiar with various ways to introduce boron. For example, the dispersant can be borated as described above. Alternatively, oil soluble polyols can be borated as described in U.S. Pat. No. 4,629,576 to Small and 4,495,088 to Liston.

The components may be incorporated into a base oil in any convenient way. Thus, each of the components can be added directly to the oil by dispersing or dissolving it in the oil at the desired level of concentration. Such blending may occur at ambient temperature or at an elevated temperature.

Preferably all the additives except for the viscosity modifier and the pour point depressant are blended into a concentrate that is subsequently blended into basestock to make finished lubricant. Use of such concentrates is conventional. The concentrate will typically be formulated to contain the additive(s) in proper amounts to provide the desired concentration in the final formulation when the concentrate is combined with a predetermined amount of base lubricant.

Preferably the concentrate is made in accordance with the method described in U.S. Pat. No. 4,938,880. That patent describes making a premix of dispersant and metal detergents that is pre-blended at a temperature of at least about 100° C. Thereafter the pre-mix is cooled to at least 85° C. and the additional components are added. Such a concentrate advantageously comprises

| ADDITIVE | MASS % (Broad) | MASS % (Preferred) |
|---|---|---|
| Dispersant(s)[2] | 32–64 | 28–45 |
| Metal Phenate | 2.4–7.8 | 2.0–6.0 |
| Friction Modifier | 0–1.6 | 0–0.78 |
| Sulfurized Phenol | 0–1.96 | 0–1.86 |
| Neutral Calcium Sulfonate | 0–0.94 | 0–0.86 |
| Metal dithiophosphate | 3.9–11.7 | 5.0–7.0 |
| Overbased Metal Sulfonate | 1.57–7.9 | 4.0–8.0 |

1. In multi-graded oils that have dispersant viscosity modifiers, the dispersant can be used at a somewhat lower treat rate. In this case the dispersant viscosity modifier serves as an additional dispersant. At least one group of investigators (U.S. Pat. No. 5,294,354 to Papke et al.) has reported a formulation with a particular dispersant viscosity modifier where the treat rate of a conventional dispersant is zero. In that case the dispersant viscosity modifier serves as the dispersant.

The final formulations may employ from 2 to 15 mass % and preferably 5 to 10 mass %, typically about 7 to 8 mass % of the additive package(s) with the remainder being base oil. A preferred concentrate avoids friction modifier, sulfurized phenols and esters and neutral calcium sulfonate.

The invention is further described by way of illustration only by reference to the following examples. In the examples, unless otherwise noted, all treat rates of all additives are reported as mass percent active ingredient.

EXAMPLE 1

A series of lubricating oils were prepared as indicated in table 1. The oils each contained supplemental antioxidant and antiwear agents, and overbased sulfonate detergent. Additionally, demulsifier and antifoam were included.

TABLE I

| | A | B | C | D | E | F | G | H |
|---|---|---|---|---|---|---|---|---|
| Component | | | | | | | | |
| Disperant (2225 Mn PIBSA:PAM PIBSA:Amine = 1.5:1, bonded) | 3.9 | 3.9 | 3.9 | 3.9 | 3.9 | 3.9 | 3.9 | 3.9 |
| Metal phenate | 0.30 | 0.30 | 0.30 | 0.30 | 0.30 | 0.30 | 0.30 | 0.30 |
| neutral CaSulfonate | — | 0.28 | — | — | 0.28 | — | 0.8 | 0.28 |
| nonylphenylsufide | — | — | 0.32 | — | 0.32 | 0.32 | — | 0.32 |
| friction modifier (etheramine) | — | — | — | 0.10 | — | 0.10 | 0.10 | 0.10 |
| Corrosion Bench Test | (as described in ASTMD4485) | | | | | | | |
| Cu, ppm | 0 | 5 | 7 | 5 | 7 | 9 | 4 | 8 |
| Pb, ppm (corr) | 0 | 3.5 | 14.1 | 5.0 | 14.1 | 25.7 | 7.7 | 24.8 |

The above table illustrates the benefits of the instant invention in affording superior corrosion inhibition.

EXAMPLE 2

The corrosion bench test (as above) was conducted to determine if conventional antioxidants, such as thiadiazoles, would yield satisfactory results. The results are shown in the following table.

TABLE II

| | A | B | C | D | E |
|---|---|---|---|---|---|
| COMPONENT | | | | | |
| Dispersant | 3.9 | 3.9 | 3.9 | 3.9 | 3.9 |
| Metal Phenate | 0.3 | 0.3 | 0.3 | 0.3 | 0.3 |
| Thiadiazole | — | 0.06 | 0.12 | 0.06 | 0.06 |
| Neut CaSulfonate | — | — | — | 0.28 | — |
| Nonylphenolsulfide | — | — | — | — | 0.32 |
| CORROSION BENCH TEST | | | | | |
| Cu, ppm | 0 | 5 | 5 | 5 | 36 |
| Pb, ppm (corr.) | 0 | 1.7 | 1.7 | 3.1 | 35.3 |

The above results show that when conventional antioxidants, such as thiadiazoles, are used in the instant lubricating oils, corrosion control is not afforded.

What is claimed is:

1. A lubricating oil for use in heavy duty diesel engines comprising an admixture (A) a major amount of an oil of lubricating viscosity (B) at least 4 mass % dispersant, (C) at least 0.3 mass % of a metal phenate, (D) less than 0.1 mass % friction modifier, (E) less than 0.3 mass % of *ashless* sulfurized phenols, (F) less than 0.12% neutral calcium sulfonate.

2. The lubricating oil of claim 1 wherein the oil has a sulfated ash content of about 0.35 to about 2 mass %.

3. The lubricant of claim 1 further characterized by having no more than 0.2 mass % active ingredient of aromatic amines having at least two aromatic groups attached directly to the nitrogen.

4. The lubricant of claim 1 further comprising a boron containing additive in an amount that provides at least 100 ppm (mass) boron.

5. The lubricant of claim 4 wherein said dispersant is a nitrogen-containing dispersant and the lubricant has a boron-to-nitrogen mass ratio of at least 0.1.

6. The lubricant of any of claims 1–5 wherein the lubricant further comprises Overbased metal sulfonate.

7. The lubricating oil of claim 6 wherein the metal sulfonate is magnesium sulfonate.

8. A concentrate comprising an admixture of:

(A) at least 32 mass % dispersant, (B) at least 2.4 mass % of a metal phenate, (C) less than 1.6 mass % friction modifier (D) less than 1.96 mass % of *ashless* sulfurized phenols, (E) less than 0.94 mass % calcium sulfonate.

9. A heavy duty diesel lubricating oil comprising a major amount of an oil of lubricating viscosity and (A) at least 4 mass % dispersant, (B) at least 0.3 mass % of a metal phenate, (C) less than 0.1 mass % friction modifier, (D) less than 0.3 mass % of *ashless* sulfurized phenols, (E) less than 0.12% neutral calcium sulfonate.

10. A concentrate comprising:

(A) at least 32 mass % dispersant, (B) at least 2.4 mass % of a metal phenate, (C) less than 1.6 mass % friction modifier (D) less than 1.96 mass % of *ashless* sulfurized phenols, (E) less than 0.94 mass % calcium sulfonate.

11. The lubricating oils of claim 1, 8, 9, or 10 further comprising (G) a metal dithiophosphate.

12. The lubricating oil of claim 11 wherein at least 50 mole % of the hydrocarbyl groups on the metal dithiophosphate are secondary.

13. The lubricating oils of claim 1,8,9 or 10 comprising less than 0.3 mass % sulfurized ester.

14. A method for controlling corrosion in diesel engines comprising using the oil of claim 1.

* * * * *